(12) United States Patent
Martin et al.

(10) Patent No.: US 6,986,366 B2
(45) Date of Patent: Jan. 17, 2006

(54) TUBE FOR THE ELECTROSTATIC COATING OF WORKPIECES

(75) Inventors: Herbert Martin, Weinstadt (DE); Martin Stiegler, Steinheim (DE)

(73) Assignee: Dürr Systems, Inc., Auburn Hills, MI (US)

( * ) Notice: Subject to any disclaimer, the term of this patent is extended or adjusted under 35 U.S.C. 154(b) by 0 days.

(21) Appl. No.: 10/649,182

(22) Filed: Aug. 27, 2003

(65) Prior Publication Data

US 2005/0098223 A1 May 12, 2005

(30) Foreign Application Priority Data

Aug. 28, 2002 (DE) ................. 102 39 516

(51) Int. Cl.
*F16L 55/16* (2006.01)
(52) U.S. Cl. .............. 138/98; 138/137; 138/146; 428/36.91
(58) Field of Classification Search ............ 138/137, 138/97, 98, 146; 428/36.91
See application file for complete search history.

(56) References Cited

U.S. PATENT DOCUMENTS

| | | | |
|---|---|---|---|
| 4,376,135 A | 3/1983 | Patel et al. ................... 427/31 |
| 4,521,462 A | 6/1985 | Smythe ...................... 427/421 |
| 4,572,437 A | 2/1986 | Huber et al. ................ 239/703 |
| 4,589,597 A | 5/1986 | Robisch et al. ............. 239/703 |
| 4,684,064 A | 8/1987 | Kwok ......................... 239/223 |
| 4,715,314 A | 12/1987 | Ramseier et al. ........... 118/631 |
| 4,791,965 A * | 12/1988 | Wynn .......................... 138/146 |
| 4,852,810 A | 8/1989 | Behr et al. .................. 239/703 |
| 4,919,333 A | 4/1990 | Weinstein ................... 239/223 |
| 4,927,081 A | 5/1990 | Kwok et al. ................ 239/223 |
| 4,944,459 A | 7/1990 | Watanabe et al. ........... 239/305 |
| 4,955,960 A | 9/1990 | Behr et al. ...................... 239/3 |
| 5,011,086 A | 4/1991 | Sonnleitner et al. ........ 239/691 |
| 5,078,321 A | 1/1992 | Davis et al. ................ 239/224 |
| 5,127,125 A | 7/1992 | Skibowski ............. 15/104.061 |
| 5,265,648 A * | 11/1993 | Lyon ........................... 138/98 |
| 5,294,217 A | 3/1994 | Talacko et al. ................ 406/91 |
| 5,300,006 A | 4/1994 | Tanaka et al. ................ 483/56 |
| 5,397,063 A | 3/1995 | Weinstein ................... 239/703 |
| 5,437,311 A * | 8/1995 | Reynolds .................... 138/115 |
| 5,524,673 A * | 6/1996 | Noone et al. ............... 138/103 |
| 5,622,210 A * | 4/1997 | Crisman et al. ............ 138/104 |
| 5,622,563 A | 4/1997 | Howe et al. ................. 118/620 |
| 5,633,306 A | 5/1997 | Howe et al. ................. 524/409 |
| 5,653,266 A * | 8/1997 | Reynolds et al. ........... 138/137 |
| 5,662,278 A | 9/1997 | Howe et al. ................. 239/700 |
| 5,680,885 A * | 10/1997 | Catallo .......................... 138/98 |
| 5,683,032 A | 11/1997 | Braslaw et al. ................ 239/7 |
| 5,683,410 A * | 11/1997 | Samson ...................... 606/194 |
| 5,704,977 A | 1/1998 | Baumann et al. ........... 118/323 |
| 5,865,380 A | 2/1999 | Kazama et al. ............. 239/704 |
| 5,937,911 A * | 8/1999 | Kodama et al. ............. 138/137 |

(Continued)

FOREIGN PATENT DOCUMENTS

DE 41 05 116 A1 8/1992

(Continued)

*Primary Examiner*—James Hook
(74) *Attorney, Agent, or Firm*—Howard & Howard

(57) ABSTRACT

For the pig delivery of the coating material at high voltage in a system for electrostatic mass-production coating of workpieces in the vicinity of grounded parts of the system, a multi-layer tube is provided, whose innermost layer forms the piggable inner wall, while a second layer consists of a high-voltage-resistant isolation material and is surrounded by a protective outer layer.

3 Claims, 1 Drawing Sheet

U.S. PATENT DOCUMENTS

| | | | |
|---|---|---|---|
| 6,037,010 A | 3/2000 | Kahmann et al. | 427/421 |
| 6,089,277 A * | 7/2000 | Kodama et al. | 138/126 |
| 6,090,450 A | 7/2000 | Kahmann et al. | 427/421 |
| 6,176,268 B1 * | 1/2001 | Hsich et al. | 138/137 |
| 6,209,587 B1 * | 4/2001 | Hsich et al. | 138/137 |
| RE37,775 E * | 7/2002 | Martucci | 174/47 |
| 6,508,610 B2 | 1/2003 | Dietrich | 406/13 |
| 6,589,348 B2 | 7/2003 | Ott | 118/684 |
| 6,602,565 B1 * | 8/2003 | Katayama et al. | 428/35.7 |
| 6,742,952 B1 * | 6/2004 | Chen et al. | 401/192 |
| 2002/0185188 A1 * | 12/2002 | Quigley et al. | 138/137 |

FOREIGN PATENT DOCUMENTS

| | | |
|---|---|---|
| DE | 43 06 800 A1 | 9/1994 |
| DE | 43 42 128 A1 | 6/1995 |
| DE | 196 10 588 A1 | 9/1997 |
| DE | 197 09 988 A1 | 10/1998 |
| DE | 197 42 588 A1 | 4/1999 |
| DE | 198 30 029 A1 | 1/2000 |
| DE | 199 09 369 A1 | 9/2000 |
| DE | 199 37 425 A1 | 3/2001 |
| DE | 100 33 986 A1 | 1/2002 |
| DE | 100 63 234 C1 | 7/2002 |
| DE | 101 30 173 A1 | 1/2003 |
| EP | 0 767 005 A1 | 4/1997 |
| EP | 0 904 848 A1 | 3/1999 |
| EP | 0 967 016 A1 | 12/1999 |
| EP | 1 108 475 A2 | 6/2001 |
| EP | 1 114 677 A1 | 7/2001 |
| EP | 0 796 663 B1 | 8/2001 |
| EP | 1 172 152 A1 | 1/2002 |
| WO | WO 94/22589 | 10/1994 |

* cited by examiner

TUBE FOR THE ELECTROSTATIC COATING OF WORKPIECES

PRIOR APPLICATIONS

This application claims priority to German Patent Application No. DE 102 39 516.0 filed on Aug. 28, 2002.

BACKGROUND OF THE INVENTION

The invention concerns a piggable tube and a method for producing such a tube according to the preamble of the independent claims. More specifically, it deals with a tube, which can be used to deliver electrically conductive coating material by means of a pig into the vicinity of parts of the system that are grounded or set to a low voltage in a system for mass-production coating of workpieces.

As is known, such tubes are needed in coating systems for the electrostatic mass-production coating of workpieces, such as vehicle chassis, with water enamel or other conductive coating material, which can be set to a high voltage on the order of 100 kV. The coating material is moved through the tube by the pig, with the pig also having to act as a perfect separating body between its own liquid or gaseous pushing medium and the delivered coating material (DE 198 30 029, EP 0 904 848, EP 1 172 152, EP 1 108 475, etc.).

Piggable tubes have special requirements, such as, among other things, flexibility, fatigue strength under reverse bending stress, chemical resistance against the media, such as conventional paint and fluids acting as flushing and/or pushing media for the pig, which can be corrosive under some circumstances and which is moved by the pig, as well as low friction values and high resistance to wear and tear relative to the passing pig and the tube itself. Another requirement is a precisely dimensioned inner diameter with high shape and dimensional accuracy also for relatively high pressures. Also important is extremely low adhesion for the transported fluids, which must be removed without residue from the inner wall for setting up insulating sections in the line formed by the tube. The inner wall of the tube should be extremely smooth. Due to these requirements, specially suited plastics must be used, which, however, have the disadvantage that these plastics do not also have optimum electrical insulating properties.

Therefore, in a coating system of the mentioned class, if piggable tubes for media at a high voltage are to be laid close to grounded parts of the system or can accidentally come close to grounded parts, then the problem arises of the risk of voltage breakdown or at least undesirably high leakage currents. Consequently, until now special high-voltage-resistant pipes or tubes have been used for lines subject to this risk in electrostatic coating systems, which are not piggable or are only poorly piggable due to their material, also, among other things, because it is difficult to manufacture them precisely with an inner diameter corresponding to the pig.

Another problem is the risk of damage to piggable tubes from external effects. From DE 100 63 234, it is known to arrange a piggable tube coaxially in an outer pipe with greater internal diameter for protection primarily against kinks and damage blocking the path of the pig, wherein a protective pad is created with compressed air between the two pipes. This kink-protection tube is not suitable for high-voltage isolation.

SUMMARY OF THE INVENTION

The goal of the invention is a tube better suited than conventional tubes in fulfilling at least one function in addition material transport, particularly that of insulating an electrically conductive medium, which is moved by a pig and which is at a high voltage, against the outer side of the tube, which is at a lower or ground potential.

This problem is solved by the features of the claims.

The different functions of the tube, particularly by selecting the best suited materials with reference to piggability and isolation, can be optimized independently by the invention.

On the one hand, the tube can be produced without problem with all properties desired for good piggability based on its inner layer. In particular, here there is the possibility of dimensional and shape accuracy of the inner wall of the tube corresponding more exactly to the pig with extremely tight tolerances, which are maintained even at high internal pressures. This property is not only important for total separation of the transported material from the pushing medium of the pig, but also for the problem-free and wear and tear-free passage of connection points of the line by the pig. The required seal in the tube can also be guaranteed at high pushing pressure and slow pig speed.

On the other hand, despite these properties, which touch upon the use of materials that are rarely suitable for high-voltage isolation, due to the separate isolation layer, the breakdown resistance required for practically all applications of electrostatic coating can also be achieved without a problem with minimum leakage currents. The isolation layer can be separate from the piggable inner layer, but should contact the inner layer as tightly as possible and without gaps for high voltage-related reasons. If the corresponding materials permit, a homogenous connection of the layers is also possible. According to a preferred embodiment, the isolation layer can have two or more layers in order to increase the isolation capacity.

The good high-voltage isolation ability can also be advantageous for delivering conductive fluids in non-piggable lines of a coating system.

Preferably, for fulfilling the various functions of the tube a protective layer can be applied to the inner part with two or more layers. This protective layer protects the inner part, and particularly the isolation layer, from damage. In contrast to the kink-protection tube known from DE 100 63 234, this protective layer should contact the inner part as closely as possible and without gaps for an electrically isolating pig tube. However, in other cases, a tube can also be advantageous, which contains air between an inner part with two or more layers and an outer protective sleeve.

The multi-layer tube described here can be used in all areas of electrostatic coating of workpieces and is also suitable, among other things, in the power-supply chain for robots and other coating machines. For example, it can be laid in a painting robot through the various shafts (joints) of the robot up to or into the atomizer. The configuration and materials of the tube described here enable its laying with small radii as well as flexibility and high bending strength against reverse stress. The tube can be used for delivering both conductive coating material, such as water enamel, and also electrically non-conductive coating materials not set to a high voltage with and if necessary also without a pig.

In addition, a piggable tube according to the invention can also be used advantageously in systems for the chemical, pharmaceutical, and food industries, etc., in which instead of the high voltage isolation, other additional functions of the tube in addition to the piggability can be realized.

The tube according to the invention can be produced simply and at low expense, particularly through extrusion, wherein, beginning with the piggable inner layer, the second and additional layers can be applied to the previously generated layer.

BRIEF DESCRIPTION OF THE DRAWINGS

The invention is explained in more detail with reference to the embodiment described in the drawing. Shown are.

DETAILED DESCRIPTION OF THE INVENTION

Figure 1:
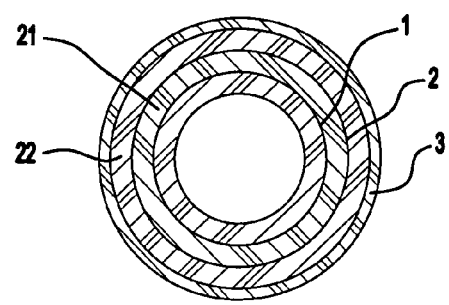
FIG. 1, the cross section of a multi-layer tube according to the invention.

The cylindrical tube illustrated in FIG. 1 consists of the piggable inner layer 1, which borders a high-voltage-resistant intermediate layer 2 acting as an isolating layer with no gaps. This intermediate layer is surrounded by a protective outer layer 3 also as much as possible without gaps. The intermediate layer 2 can be formed with multiple layers and for the illustrated example consists of two partial layers 21 and 22 bordering each other without gaps. The entire tube is electrically non-conductive.

For the inner layer 1, a plastic is selected, which guarantees as much as possible the desired properties of a good piggable tube mentioned in the introduction. Well suited is, e.g., PFA (perfluoroalkoxy polymers), for example PFA 420.

The intermediate layer 2 consists of another material than the piggable inner layer 1. To achieve the high-voltage isolation function, the tubes can be manufactured, e.g., from PE (polyethylene), particularly LDPE (low-density PE). If partial layers, such as 21 and 22, are provided, these can preferably consist of the same plastic or also of different materials. The electrical breakdown resistance of the intermediate layer 2 measured, e.g., according to European standard EN 50176, should be equal to at least 30 kV/mm in typical cases.

For the example considered here, the outer layer 3, which acts as a protective shell and which should tend towards a static charge as little as possible, can be, among other things, PUR (polyurethane) or also possibly a similar material as the inner layer, thus PFA. The outer layer is used, among other things, as protection against wear and tear and prevents the so-called cold creeping of the isolation layer located underneath.

For a typical example for electrostatic coating systems of a piggable tube of the illustrated class with an internal diameter of approximately 9 mm, the outer diameter can equal approximately 17 mm.

Figure 2:
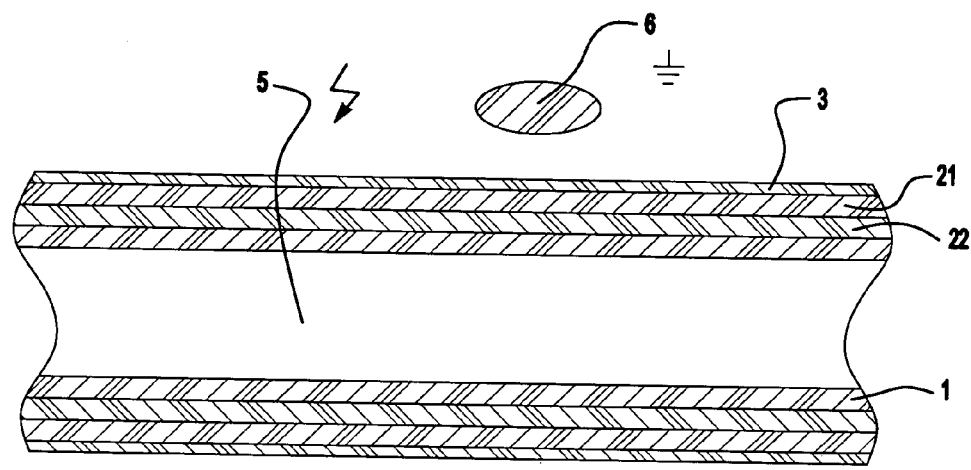
FIG. 2, a longitudinal section of the tube at a reduced scale relative to that in FIG. 1.

In a reduced longitudinal section view, FIG. 2 shows the tube described above with an electrically conductive fluid 5, such as water enamel or its thinner, which is located in the tube, which is at a high voltage on the order of 100 kV, and which should be isolated by the tube from components 6 located in its vicinity on the outside.

Figure 3:
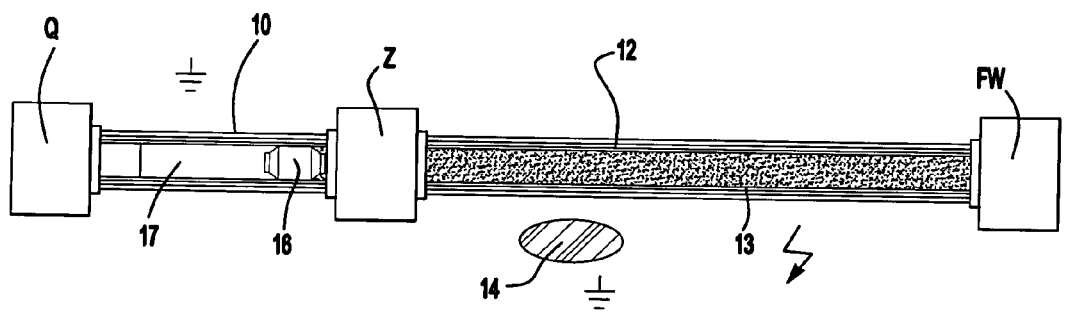
FIG. 3, the arrangement of tubes according to FIGS. 1 and 2 in an electrostatic coating system.

FIG. 3 shows a part of a system for the electrostatic coating of vehicle chassis or other workpieces as an example for the use of tubes of the type described here. In this system, a second line section formed similarly to the multi-layer tube 12 connects to a piggable line section formed with the same layer configuration as in FIG. 1 between the pig source station Q and the target station Z by a first multi-layer tube 10. The second line section can lead, e.g., to a paint changer FW. The multi-layer tube 12 does not have to be piggable for this example, but it contains an electrically conductive paint (or thinner) 13 at a high voltage on the order of 100 kV, which is isolated by the tube 12 against adjacent grounded components 14. In contrast, the tube 10 contains a pig 16, which empties the line by creating an isolating section 17 and which scrapes the previously fed fluid without leaving residue from the inner wall of the tube 10. Also the piggable tube 10 is used for electrically isolating the delivered fluid at high voltage, e.g., located on one side of the tube 13, from the grounded surroundings, wherein the tube 10 also isolates the target station Z set to a high voltage from the grounded source station Q.

The tube 12 can have another diameter than the tube 10, but the tubes can be produced from the same materials. The material of the inner layer 1 (FIG. 1) of the tube 12 is definitely not important for the piggability for this example, but it is important for other properties of the tube mentioned in the introduction, such as chemical resistance, low adhesion, i.e., good cleaning by fluid or gaseous cleaning media, smooth inner surface, etc.

The tube described here is preferably produced by multi-layer extrusion. Initially, a tube forming the inner layer 1 can be produced through extrusion, whose inner diameter should be dimensioned with as low a tolerance as possible (preferably max.±0.05 mm). The isolation layer is then extruded on this inner layer. On the tube consisting of the inner layer 1 and the isolating intermediate layer 2, the protective outer layer 3 is then applied likewise through extrusion. The individual layers can be created at different times or also simultaneously with multi-layer extruders. The result is a multi-layer tube, whose individual layers do not have to be connected rigidly to each other, but contact each other with practically no gaps.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A tube for the transport of a flowable material, comprising:
    a first layer having an inner wall with piggable properties for facilitating the transfer of a pig through said tube thereby moving the flowable material through said tube, wherein said first layer comprises perfluoroalkoxy polymers; and
    a second layer providing at least one of isolation material for high-voltage resistance and material providing additional functionality to said tube, wherein said second layer is formed from low-density polyethylene encircling said perfluoroalkoxy polymers of said first layer, wherein said second layer is surrounded by a protective layer positioned adjacent said second layer thereby protecting said second layer from damage, wherein said protective layer comprises perfluoroalkoxy polymers.

2. The tube according to claim 1, wherein said second layer comprises two sub-layers of low-density polyethylene.

3. The tube according to claim 1, wherein said second layer provides electrical resistance of at least about 30 kV/mm.

* * * * *